US012780712B1

(12) United States Patent
Campion et al.

(10) Patent No.: US 12,780,712 B1
(45) Date of Patent: Nov. 3, 2026

(54) OPTICAL FIBER; DOPED-, SINTERED-BODY; AND MAKING SUCH

(71) Applicant: CORNING INCORPORATED, Corning, NY (US)

(72) Inventors: Michael John Campion, Corning, NY (US); Timothy Michael Gross, Painted Post, NY (US); Kenneth Edward Hrdina, Horseheads, NY (US); Jackson Krebs, Painted Post, NY (US); John Edward Maxon, Pulaski, NY (US); Pushkar Tandon, Painted Post, NY (US); Christopher Scott Thomas, Horseheads, NY (US); Guangran Zhang, Horseheads, NY (US); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/644,579

(22) Filed: Apr. 10, 2026

Related U.S. Application Data

(60) Provisional application No. 63/991,681, filed on Feb. 26, 2026.

(51) Int. Cl.
*C03B 37/012* (2006.01)
*C03B 37/027* (2006.01)

(52) U.S. Cl.
CPC .. *C03B 37/01282* (2013.01); *C03B 37/02781* (2013.01); *C03B 2201/12* (2013.01); *C03B 2201/24* (2013.01); *C03B 2203/16* (2013.01)

(58) Field of Classification Search
CPC .................... C03B 37/01282; C04B 2235/661
See application file for complete search history.

(56) References Cited

U.S. PATENT DOCUMENTS 3,301,635 A 1/1967 Du Pont
4,867,774 A * 9/1989 Dorn ................ C03B 37/01282 264/117

(Continued)

FOREIGN PATENT DOCUMENTS

EP 2145865 A1 1/2010
EP 2377826 A1 10/2011

(Continued)

OTHER PUBLICATIONS

WO-2010029147-A1 (Werdecker) Mar. 18, 2010(English language translation). [online] [retrieved Jun. 24, 2026]. Retrieved from: Clarivate Analytics. (Year: 2010).*

(Continued)

*Primary Examiner* — Erin Snelting
(74) *Attorney, Agent, or Firm* — Russell S. Magaziner

(57) ABSTRACT

A method of making a doped-, sintered-body includes selecting or modifying a grain size distribution to be sintered such that the distribution includes a spike in concentration of larger grains. The method then includes not overly pressing the grains together, prior to sintering, such that the pressed grains still include large pores. The method includes interrupting sintering when smaller pores in the partially-sintered body are closed but larger pores remain open and interconnected with one another throughout the partially-sintered body. The method includes infusing the partially sintered body with a fluid dopant, where the fluid dopant may be joined into a molecular network of the body as the body is further sintered to form a fully-sintered, -doped body.

20 Claims, 8 Drawing Sheets

(56) References Cited

U.S. PATENT DOCUMENTS

| | | | |
|---|---|---|---|
| 4,872,895 | A | 10/1989 | Fleming et al. |
| 4,961,767 | A | 10/1990 | Schermerhorn et al. |
| 5,086,352 | A | 2/1992 | Yamagata et al. |
| 6,099,749 | A | 8/2000 | Boes et al. |
| 6,796,143 | B2 | 9/2004 | Clasen et al. |
| 7,069,746 | B2 | 7/2006 | Oswald et al. |
| 7,172,983 | B2 | 2/2007 | Alkemper et al. |
| 7,419,924 | B2 | 9/2008 | Koike et al. |
| 7,585,598 | B2 | 9/2009 | Maida et al. |
| 7,923,394 | B2 | 4/2011 | Maida et al. |
| 7,935,648 | B2 | 5/2011 | Maida et al. |
| 7,939,457 | B2 | 5/2011 | Hrdina et al. |
| 7,981,824 | B2 | 7/2011 | Englisch et al. |
| 7,989,378 | B2 | 8/2011 | Koike et al. |
| 8,034,731 | B2 | 10/2011 | Koike et al. |
| 8,093,165 | B2 | 1/2012 | Koike et al. |
| 8,178,450 | B2 | 5/2012 | Koike et al. |
| 8,329,604 | B2 | 12/2012 | Iwahashi et al. |
| 8,377,612 | B2 | 2/2013 | Maida et al. |
| 8,590,342 | B2 | 11/2013 | Koike et al. |
| 8,735,308 | B2 | 5/2014 | Koike et al. |
| 9,522,840 | B2 | 12/2016 | Thomas et al. |
| 9,540,271 | B2 | 1/2017 | Becker et al. |
| 10,029,938 | B2 | 7/2018 | Hofmann et al. |
| 10,114,280 | B2 | 10/2018 | Maida et al. |
| 11,987,521 | B2 | 5/2024 | Eva |
| 2003/0159466 | A1 | 8/2003 | Bowden et al. |
| 2005/0220692 | A1 | 10/2005 | Mangold et al. |
| 2008/0203625 | A1 | 8/2008 | Oswald et al. |
| 2010/0003609 | A1 | 1/2010 | Maida et al. |
| 2011/0132038 | A1* | 6/2011 | Dawes .............. C03B 37/01282 65/408 |
| 2012/0058419 | A1 | 3/2012 | Maida et al. |
| 2013/0123092 | A1 | 5/2013 | Koike et al. |
| 2015/0307387 | A1* | 10/2015 | Fagan ............... C03B 37/01211 65/427 |
| 2016/0257599 | A1* | 9/2016 | Trevor ............. C03B 37/01257 |
| 2016/0375607 | A1 | 12/2016 | Badding et al. |
| 2018/0002217 | A1* | 1/2018 | Boughton ............. C03B 37/014 |
| 2018/0147521 | A1 | 5/2018 | Dannoux |
| 2019/0207252 | A1 | 7/2019 | Badding et al. |
| 2019/0256399 | A1 | 8/2019 | Annamalai et al. |
| 2020/0038796 | A1 | 2/2020 | Fekety et al. |
| 2022/0250964 | A1 | 8/2022 | Campion et al. |
| 2024/0034667 | A1 | 2/2024 | Dawes et al. |
| 2024/0067558 | A1 | 2/2024 | Campion et al. |
| 2024/0069429 | A1 | 2/2024 | Campion et al. |
| 2024/0246850 | A1 | 7/2024 | Campion et al. |
| 2024/0417306 | A1 | 12/2024 | Campion et al. |
| 2025/0019289 | A1 | 1/2025 | Dawes et al. |

FOREIGN PATENT DOCUMENTS

| | | | | |
|---|---|---|---|---|
| EP | 2426091 | B2 | 9/2023 | |
| JP | 5942848 | B2 | 6/2016 | |
| JP | 7120338 | B2 | 8/2022 | |
| WO | WO-2010029147 | A1 * | 3/2010 | ....... C03B 37/01291 |

OTHER PUBLICATIONS

"ULE® Corning Code 7972 Ultra Low Expansion Glass", Advanced Optics and Materials, 2016, 4 pages.

Minehan et al., "Sintering of titania-silica powder compacts with a bimodal pore-size distribution", Journal of Non-Crystalline Solids 147&148 (1992), pp. 582-587.

U.S. Appl. No. 63/451,983, titled "Methods of Controlling Steam Pressure To Produce Titania-Silica Glass", filed on Mar. 14, 2023.

Zhuravlev, "The surface chemistry of amorphous silica. Zhuravlev model", Colloids and Surfaces A: Physicochemical and Engineering Aspects 173 (2000), pp. 1-38.

* cited by examiner

OPTICAL FIBER; DOPED-, SINTERED-BODY; AND MAKING SUCH

PRIORITY

This application claims the benefit of priority of U.S. App. No. 63/991,681 filed on Feb. 26, 2026, which is incorporated herein by reference in its entirety.

BACKGROUND

Aspects of the present disclosure relate to inorganic material, such as a glass body or preform as may be used to make optical fibers or for other purposes. That said, aspects of the present disclosure may also relate to glass-ceramic, ceramic, and doping bodies of the same.

Glass-based optical fibers may include a glass cladding and glass core, which may be made of different glasses, where the different glasses have an index of refraction mismatch that facilitates transmission of light from one end of the optical fiber to another, through the core, while mitigating losses of the light through the cladding. Other optical fibers may have a so-called hollow core, where the core is open and/or filled with air or inert gas, and light is still guided along the core by a glass cladding and/or other glass components of such optical fibers, such as glass capillary tubes within the cladding for example.

The glass of optical fibers, such as of the core, may have a high silica content and may accordingly comprise a high melting temperature, such as over 800° Celsius (C), such as over 1000° C. (i.e. over 1800° Fahrenheit). Furthermore, because of strict optical requirements for such glass, which may carry light tens to hundreds of kilometers, impurities and inclusions, such as solid particles, are carefully minimized and avoided. Accordingly, equipment used to melt and form such glasses, which may operate at very high temperatures, also generally does not leach or otherwise contaminate the glass at such temperatures.

During manufacturing of an optical fiber, a body (also called preform, boule, article) of the glass of the optical fiber may be heated on one end, such that the body necks down to a strand, which is pulled away from the body and which becomes the optical fiber. Features and different glass layers within the body are reduced in size during the pulling, and become the cladding(s), core(s), capillary tube(s), etc. within the optical fiber. The process is somewhat like taffy pulling in a candy shop, where the body of glass eventually is converted to a long length of optical fiber, which may then be wound on a reel and may have a length of over 100 m, over 1 km, over 10 km, or longer, depending upon volume of the body, size of the reel, and dimensions of the optical fiber.

A need exists for efficient ways of manufacturing inorganic materials, such as glass for optical fibers and other applications, where the material may be doped.

SUMMARY

Applicants make bodies of glass that melt at high temperatures, as may be suitable for drawing optical fibers therefrom and for other applications, by spraying small glass grains (e.g., particles, soot) into or onto a receptacle such as a receiving rod, vat, or other target. The grains form from different chemical vapors (e.g., octamethylcyclotetrasiloxane) that may be oxidized in a flame. These grains may be pure silica, doped-silica, or of other materials. For example, Applicants may dope silica with a cation dopant, such as cations of representative oxides including for example germania ($GeO_2$), cerium oxide ($CeO_2$), titania ($TiO_2$), or others. During this process of grain collection, Applicants may add fluid dopants, such as fluorine, ammonia, hydroxide, or other vapor or liquid, to the forming environment to mix with the grains and modify properties of material made from the grains, such as refractive index, strength, elasticity, optical transmission, viscosity, or other properties. The fluid dopants may mix fairly evenly into the material as the grains collect in the receptacle. However, spraying of the chemical vapors over time, which may be sprayed by multiple sources and/or over a spinning target (i.e. rotating vat), may result in layering or irregular laydown of dopant(s) in the grains, which may manifest as stria or other irregularities in resulting glass, which could potentially cause weaknesses in optical fibers, variations in coefficients of thermal expansion, increases signal loss, or other issues.

To increase uniformity of dopants in the grains, Applicants have collected silica grains, such as doped-silica, from a single-source sprayer. These grains may then be collected and pressed by Applicants into a mold, to concentrate the grains. Once compressed, Applicants then infuse the grains with vapor dopant(s) as described and sinter the grains into glass. This process may improve uniformity of the dopant in resulting glass, and largely or completely achieve glass without stria or irregularities associated with the deposition process. That said, this single-source process may suffer from non-uniformity of the vapor dopant (e.g., fluorine or hydroxide vapor). For example, in a pressed body, more vapor dopant infuses near the surfaces, and less reaches the center of the pressed body.

To achieve still better uniformity of the vapor-carried dopant in glass made by sintering pressed grains from a single source, Applicants contemplate keeping thicknesses of the respective pressed bodies relatively thin (e.g., on order of millimeters; less than 1 cm thick). In thin pressed bodies, there is less room for vapor dopant variation during vapor infusion. After infusion and sintering, thin bodies may then be stacked together. The stack may then be re-melted together to try to achieve a larger body with uniform cation dopant and vapor-carried dopant. However, even with this process, variation in glass properties (e.g., strength, refractive index, coefficient of thermal expansion) and/or inclusions (e.g., small gaseous seeds) may be present, such as where the thin bodies are joined. Furthermore, additional steps of stacking and re-melting may be highly cumbersome or impractical.

As such, a more specific need exists for a more efficient way to produce large bodies of high-melting temperature glasses, glass-ceramics, and/or polycrystalline ceramic that may be doped with vapor or liquid carried dopants, where precision in uniformity and purity of the resulting glass body facilitates performance attributes in products made from the glass, such as optical fibers or other specialty glass, glass-ceramics, and/or polycrystalline ceramic products, such as filters, optics, covers, reflectors or mirrors, windows, high-temperature and low-expansion substrates, calibration parts, and other uses.

As further explained herein, Applicants discovered that by purposefully selecting or modifying grain size distribution of grains to be sintered such that the distribution includes a spike in concentration of larger grains, which may be agglomerated from smaller grains, and then by not overly pressing the grains together, prior to sintering such that the pressed grains still include large pores (i.e. cavities in microstructure between solid material) in a pressed body of the grains, that sintering of the pressed body can be interrupted at a key point during sintering where the pressed body is only partially-sintered and where smaller pores in the partially-sintered body are closed but larger pores remain open and interconnected with one another throughout the partially-sintered body. Passages of the open and interconnected larger pores of the partially-sintered body may then be infused with a fluid dopant, such as a dopant that may be volatile and normally quickly escape a sintering body. Instead, if infused into the passages of the open and interconnected larger pores of the already-partially-sintered body, the fluid dopant may be joined into a molecular network of the body as the body is further sintered to form a fully-sintered, -doped body.

The present technology may be particularly beneficial for making a large body of glass or other inorganic material that is uniformly doped with a fluid dopant, such as a vapor-carried dopant (e.g., ammonia, metal halide, hydroxide), where the body need not be thin in order to achieve good homogeneity of the vapor-carried dopant. Instead, passages of the open and interconnected larger pores may carry fluid dopant deep into and throughout all parts of the partially-sintered body prior to further sintering. Then the fluid dopant may be sealed into the body or held within the body by pressure during further sintering. Since this technique may be used to dope a large body, there may be no need to individually dope thin sheets of material, stack, and re-melt the material, thereby saving considerable time and effort making parts. Further, the partially-sintered body may be machined while partially-sintered.

Additional features and advantages are set forth in the detailed description that follows, and in part will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURE

The accompanying figures are included to provide a further understanding and are incorporated in and constitute a part of this specification. The drawing/images of the figures illustrate one or more aspects of the present disclosure, and/or together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in the figures or described in the text relating to an aspect may be applied to another aspect described elsewhere in the text.

Figure 1A:
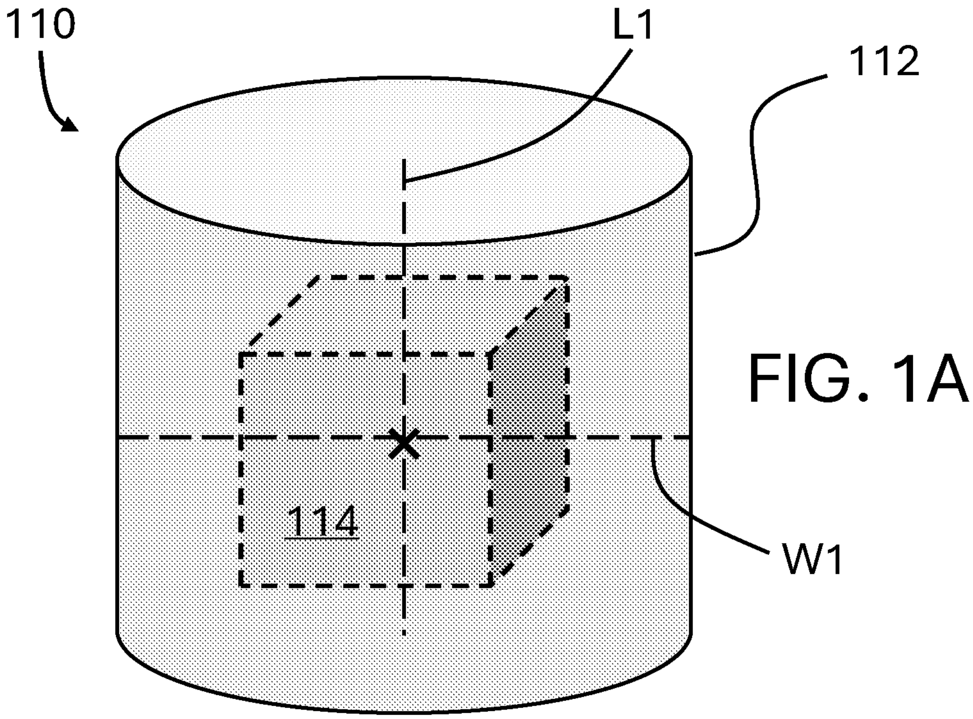
FIG. 1A is a perspective view of a doped-, sintered-body (or preform, or boule, or article, or part) overlaying a volume defined by a cube space positioned within the body according to an aspect of the present disclosure.
Figure 1B:
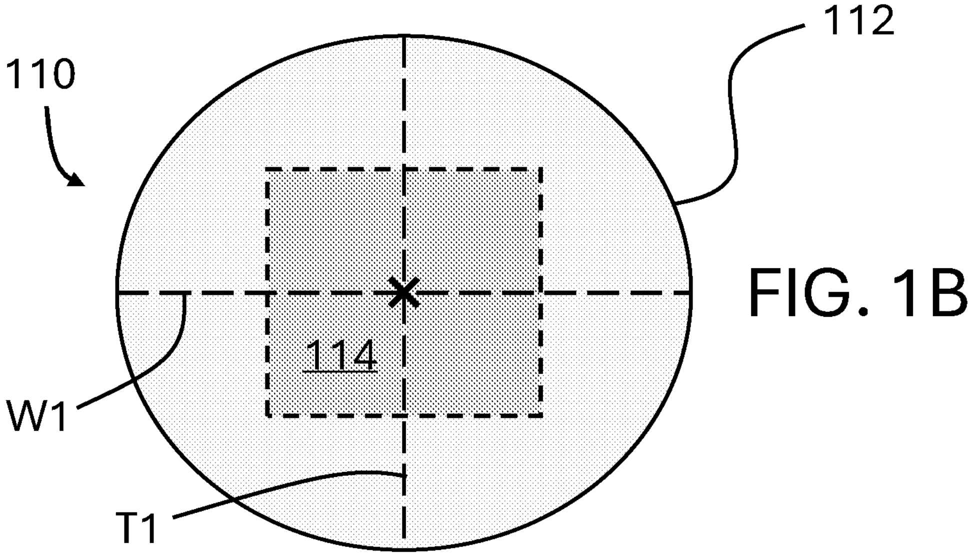
FIG. 1B is a top view of the doped-, sintered-body of FIG. 1A.

Referring to FIGS. 1A and 1B, a body 110 of material, such as fully-amorphous glass, glass-ceramic, or polycrystalline ceramic, has a width W1 between outer surfaces 112 of the body 110, which may extend through a geometric center × thereof; a length L1 orthogonal to the width W1 and between outer surfaces 112 of the body 110, which too may extend through the center ×; and a thickness T1 orthogonal to both the width W1 and the length L1 and also between outer surfaces 112 of the body 110, which may extend through the center ×. Glass-ceramic is a material with a glass phase and a crystalline phase, crystals of the crystalline phase distributed throughout the material. Accordingly, the length L1 is greater than or equal to the width W1, and the width W1 is greater than or equal to the thickness T1.

According to an aspect of the present disclosure, the body 110 may be bulky or squat. For example, according to an aspect, the length L1 may be greater than 1 centimeter (cm), such as greater than 3 cm, such as greater than 5 cm, such as greater than 8 cm, such as greater than 1 decameter (dam), such as greater than 3 dam, such as greater than 5 dam, such as greater than 8 dam, such as greater than 1 meter (m), such as greater than 3 m, such as greater than 5 m, such as greater than 8 m; the width W1 may be greater than 10 millimeters (mm), such as greater than 50 mm, such as greater than 1 cm, such as greater than 4 cm, such as greater than 8 cm, such as greater than 1 dam, such as greater than 3 dam; and the thickness T1 is greater than 10 mm, such as greater than 50 mm, such as greater than 1 cm, such as greater than 2 cm, such as greater than 4 cm such as greater than 8 cm, such as greater than 1 dam, such as greater than 3 dam. In contemplated forms, the body 110 may comprise a fiber preform or other glass part having a thickness T1 greater than 10 cm, such as greater than 20 cm, and/or less than 10 m.

According to an aspect of the present disclosure, the body 110 overlays a squat space, such as a cube 114 or cuboid volume. The 114 cube shown in FIG. 1 is representative of geometry of the body 110 such that the body at least includes a portion thereof that fully overlay such a volume. Put another way, material of the body 110 is thick, wide, and long enough that a solid cube of the material of the body 110 may be cut therefrom. According to an aspect, edges of the cube 114 (i.e. length, width, and height of the cube 114 equal to one another in dimension) may be 5 mm, 10 mm, 2 cm, 5 cm, 10 cm, or larger, and/or less than 10 m, such as less than 5 m.

As indicated above, flat geometries, such as sheets of glass may be stacked on top of one another and melted together, but such manufacturing processes may be less preferred due to extra steps, time, and cost; and Applicants have invented new methods of manufacturing glass bodies as disclosed herein that allow for squat volumes of glass to be made all at once, while achieving uniform doping. Furthermore, while the cube 114 is shown with respect to the body 110 of FIG. 1, the cube 114 or an equivalent volume defined thereby may be likewise overlaid by pressed body 210 of FIG. 2 and partially-sintered by body 410 of FIG. 4 at least because sintering may shrink the pressed body 210 to form the partially-sintered body 410, and further sintering may in turn shrink the partially-sintered body 410 to form the body 110 of material, which may include doped-, sintered-material.

That said, according to an aspect, the body 110 may comprise an elongate fiber having a length L1 greater than 1 kilometer (km), such as greater than 10 km, such as greater than 20 km, and/or less than 150 km. For bodies, such as an optical fiber, the width W1 may be far less than 10 mm, such as less than 1 mm, and/or at least 50 micrometers (μm). That said, for bodies, such as a preform of an optical fiber, the length L1 may be less than 20 m, such as less than 10 m. According to an aspect, the body 110 may comprise fiber preform or other glass part having a width W1 greater than 10 cm, such as greater than 20 cm, and/or less than 10 m.

Figure 5A:
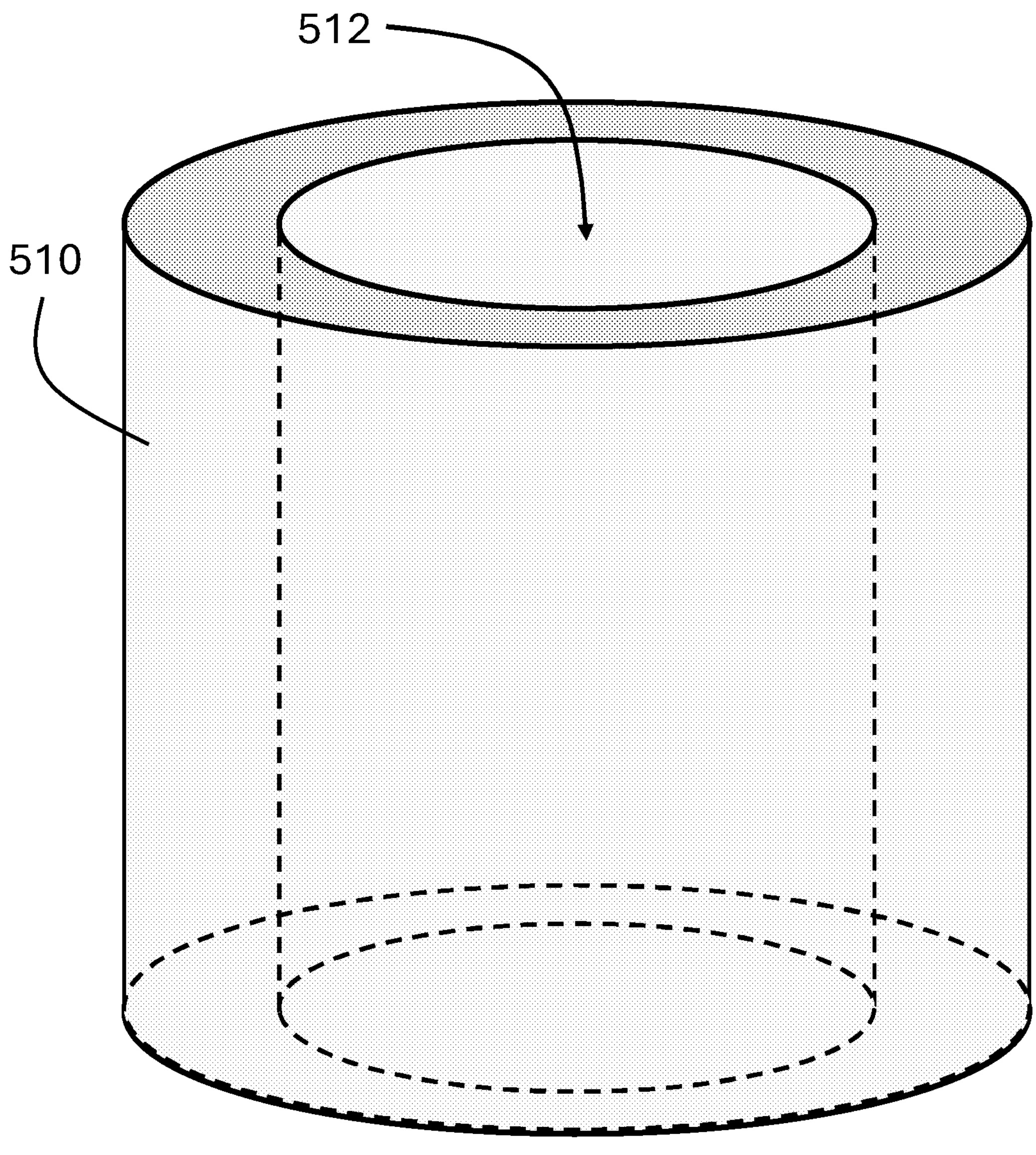
FIG. 5A is a perspective view of a partially-sintered body that has been machined to remove a lengthwise center portion thereof according to an aspect of the present disclosure.
Figure 5B:
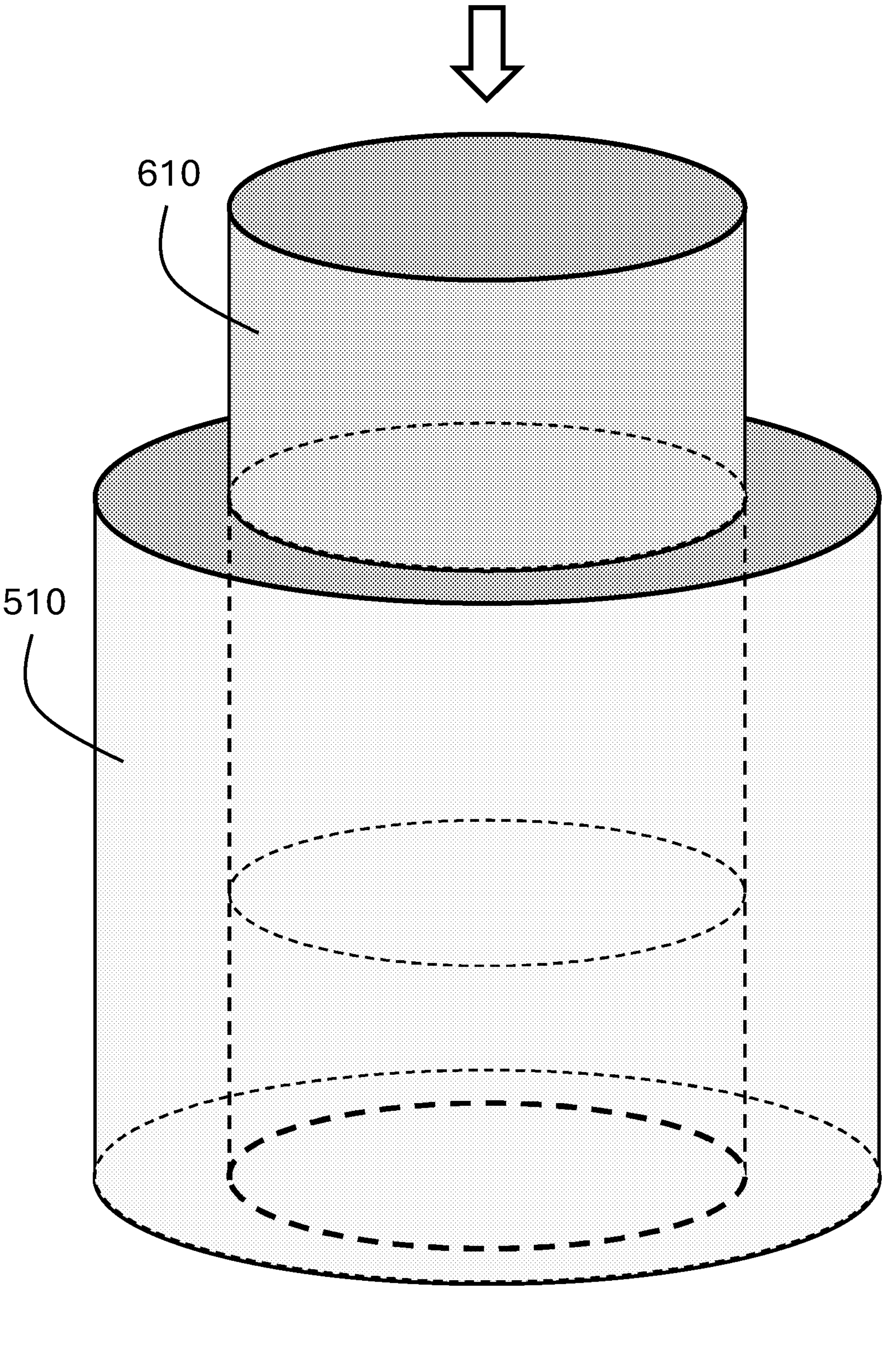
FIG. 5B is a perspective view of the partially-sintered body of FIG. 5A with a second partially-sintered body in the lengthwise center portion.
Figure 5C:
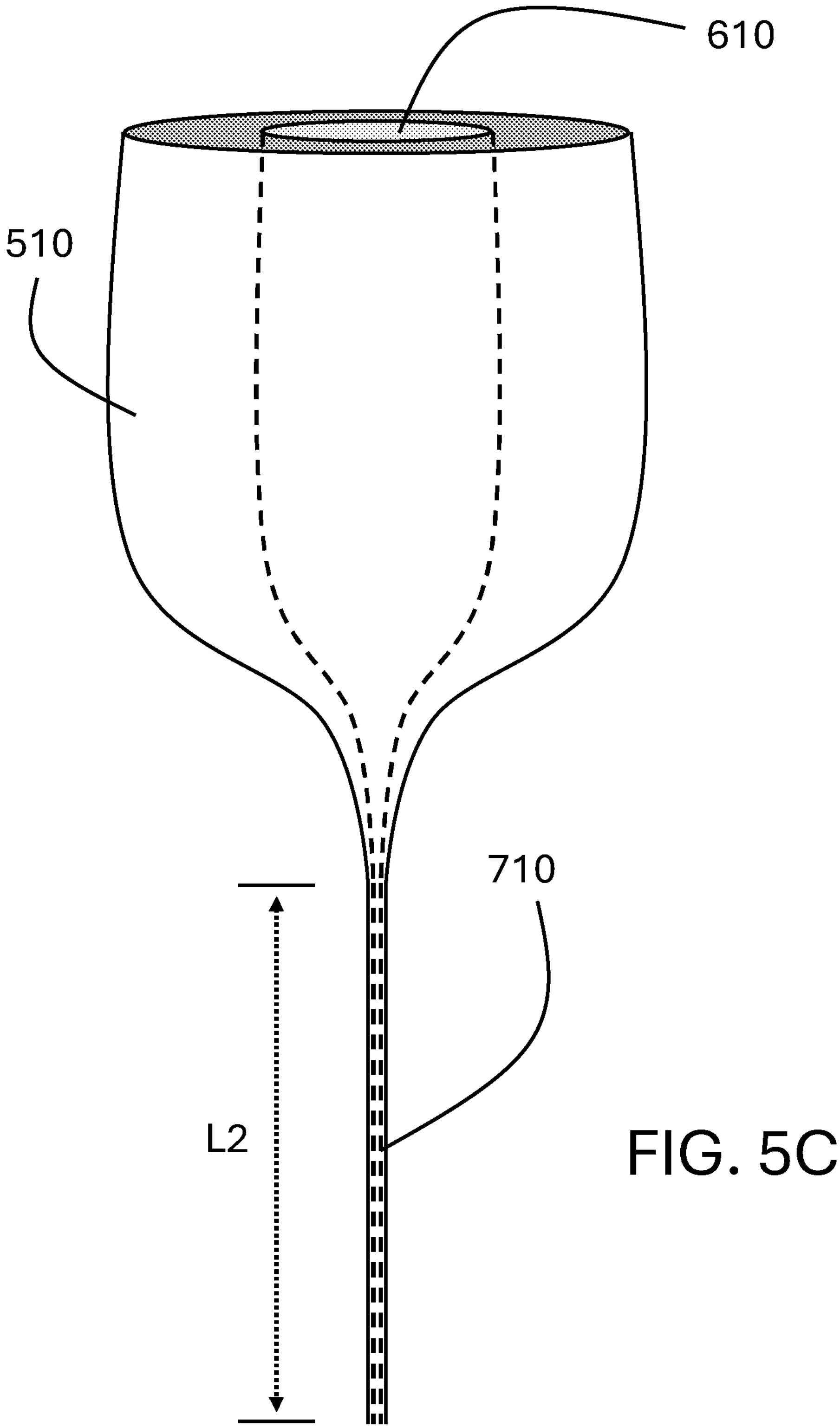
FIG. 5C is a perspective view of the first and second bodies of FIG. 5B fully sintered together, with a fiber being drawn from an end thereof.

Further still, geometry of the body 110 may be complex or irregular, with more than one or variable thickness T1, width W1, or length L1 (see, generally FIG. 5C). As such, while the body 110 is shown in FIG. 1A to be cylindrical, Applicants contemplate that the body 110 of glass, glass-ceramic, or polycrystalline ceramic may be a wide range of shapes and geometries, such as cuboid, prism- or pyramid-shaped such as with rounded edges, cone, hemispherical, more complex-shaped, irregularly shaped, or otherwise. So, while the thickness T1 may match the width W1 (and both may match the length L1, for a spherical body), in many geometries, the thickness T1 may less than the width W1, which may in turn be less than the length L1. Unless otherwise specified, the thickness T1 may be any thickness of the body 110 that is orthogonal to both the width W1 and the length L1 and between outer surfaces 112. Likewise for the width W1, which is at least orthogonal to the length L1 and the thickness T1 and between outer surfaces 112; where the length L1 may be oriented along a longest dimension of the body 110 between the outer surfaces 112.

According to an aspect of the present disclosure, the body 110 is of a monolith of a single material, and the material may be doped, as further explained herein. According to an aspect, material of the body 110 is inorganic, such as glass, glass-ceramic, polycrystalline ceramic. According to an aspect, material of the body 110 comprises grains sintered to one another. As used herein, the term grain(s) refers to an individual, basic unit combined with other such units in a body as disclosed herein and is meant to include crystalline and non-crystalline particles and/or agglomerates thereof, as called granulates, aggregates, particles, granules, soot. That said, the material of the body 110 may be processed so as to remove indicia of the grains, such as where the grains are fully melted and the material of the body is fully amorphous. According to an aspect, the grains may comprise a high melting temperature, such as greater than 500° C., greater than 700° C., greater than 900° C., greater than 1000° C., greater than 1100° C., or even greater than 1200° C., such that melting the grains or forming the material via other methods may be difficult, impractical, or impossible. As used herein in context of melting temperature, the term comprise is meant to convey that the grains may melt over a range of temperatures and the melting temperature is a melting temperature of the grains. For glass grains as further explained herein, the melting temperature too may span a range of temperatures, and may expressly be narrowed to the liquidus temperature of the glass for example.

According to an aspect of the present disclosure, material of the body 110 may comprise silica ($SiO_2$) as a representative oxide constituent, meaning that a molecular network thereof may hold elements of silica (i.e. silicon) in proportion to elements of other such representative oxide constituents (e.g., boria ($B_2O_3$), alumina ($Al_2O_3$)). Silica may be contributed to the grains via raw materials in the form of compounds containing the silica, and/or may be provided directly as silica, such as when generated via flame hydrolysis of silicon tetrachloride. According to an aspect, silica may be a major constituent of the material of the body 110, such at least 30 percent by weight (wt %) of the material, such as at least 50 wt %, such as at least 60 wt %, such as at least 70 wt %, such as at least 80 wt %, such as at least 90 wt %, and/or equal to or less than 100 wt % such that the material comprises other constituents. Applicants contemplate glasses with titania as such a major constituent in such amounts, or alumina as such a major constituent in such amounts.

According to an aspect, material of the body 110 may comprise constituent(s) other than or in addition to silica, such as where the other constituent(s) have lesser concentration in the material than the silica. When in relatively small concentrations (e.g., less than 20 wt %, such as less than 10 wt %, and/or at least 0.05 wt %, such as at least 0.1 wt %, such as at least 0.5 wt %) in contrast to silica or another major constituent, a constituent of small concentration may be described as a dopant, such as a cation dopant to silica. Examples of such dopants include germania ($GeO_2$), boria or boron trioxide ($B_2O_3$), phosphorus pentoxide ($P_2O_5$), and/or alumina ($Al_2O_3$). Further still rare-earth elements, such as erbium (Er), neodymium (Nd), thulium (Tm), holmium (Ho), ytterbium (Yb), and others may likewise be added in such dopant amounts where basic oxide forms thereof (i.e. erbia ($Er_2O_3$), neodymia ($Nd_2O_3$), thulium(III) oxide ($Tm_2O_3$), holmium(III) oxide ($Ho_2O_3$), ytterbium(III) oxide ($Yb_2O_3$)) constitute the above concentration percentages of the material.

As with the silica, grains of other constituents may be combined with grains of silica in raw materials as more complex compounds. For example, boric acid ($B(OH)_3$) may be used to contribute boron to a batch of constitutes, which may then be converted to and counted in a description of the corresponding material composition (e.g., glass) as boria ($B_2O_3$). Or, as initially described above, flame hydrolysis can be used to produce grains of basic metal oxides including and beyond silica, such as titania, alumina, germania, such as by reacting metal chlorides (e.g., $GeCl_4$, $TiCl_4$, $AlCl_3$) with oxygen and hydrogen in flames of high temperatures.

According to an aspect, metal oxides produced by flame hydrolysis other than silica may be used as a or the major constituent of materials disclosed herein, such as alumina or titania as a constituent over 30 wt %, over 40 wt %, over 50 wt %, or even over 60 wt %, such as where the material may be considered an aluminate glass or titanate glass, as opposed to silicate or doped-silica. Further still, Applicants contemplate nanocrystalline oxides such as niobium oxide ($Nb_2O_5$), tantalum oxide ($Ta_2O_5$), zirconia ($ZrO_2$) may be generated via such methods to produce crystalline grains and sintered polycrystalline-ceramic, glass, or glass-ceramic bodies, such as when crystal grains are combined with glass grains as disclosed herein, or where so-called pre-cursor glass as disclosed herein includes nucleating agents and is heat-treated to grow crystals therein, and made into glass-ceramic.

Beyond composition, according to an aspect of the present disclosure, the grains are created, selected, or otherwise controlled to be sized such that there is a specific grain size distribution and corresponding pore-size distribution in a resulting pressed body of the grains. According to an aspect, there is a disproportionately high concentration of large grains and correspondingly high concentration of large pores, more than may typically occur from flame hydrolysis. According to an aspect, once made, very small grains from flame hydrolysis can be agglomerated together into larger grains, such as by rolling the small grains in a barrel or through vibration agglomeration for example. While such method may not remove or agglomerate all small grains, the agglomeration may be performed until a bi- or multi-modal distribution of grain sizes is produced with a spike in incremental pore volume over a desired pore size when pressed as further explained herein. The term spike as used herein refers to a high point along a distribution or "bump" and the term peak refers to a local maximum of the spike. That said, Applicants recognize that in practice distributions may have irregularities and fluctuations along such a spike, and Applicants refer to the general shape as further explained herein in the context of the plots of FIGS. 3A and 3B for example. Accordingly, the term dip as used herein refers to a valley or low point along a distribution, where the bottom of dip is a local minima. Grain size distributions as disclosed herein may be unimodal (e.g., after smaller grains are sintered and smaller pores are sintered), bi-modal (e.g., due to agglomeration for example), or multi-modal as discussed herein.

Figure 2:
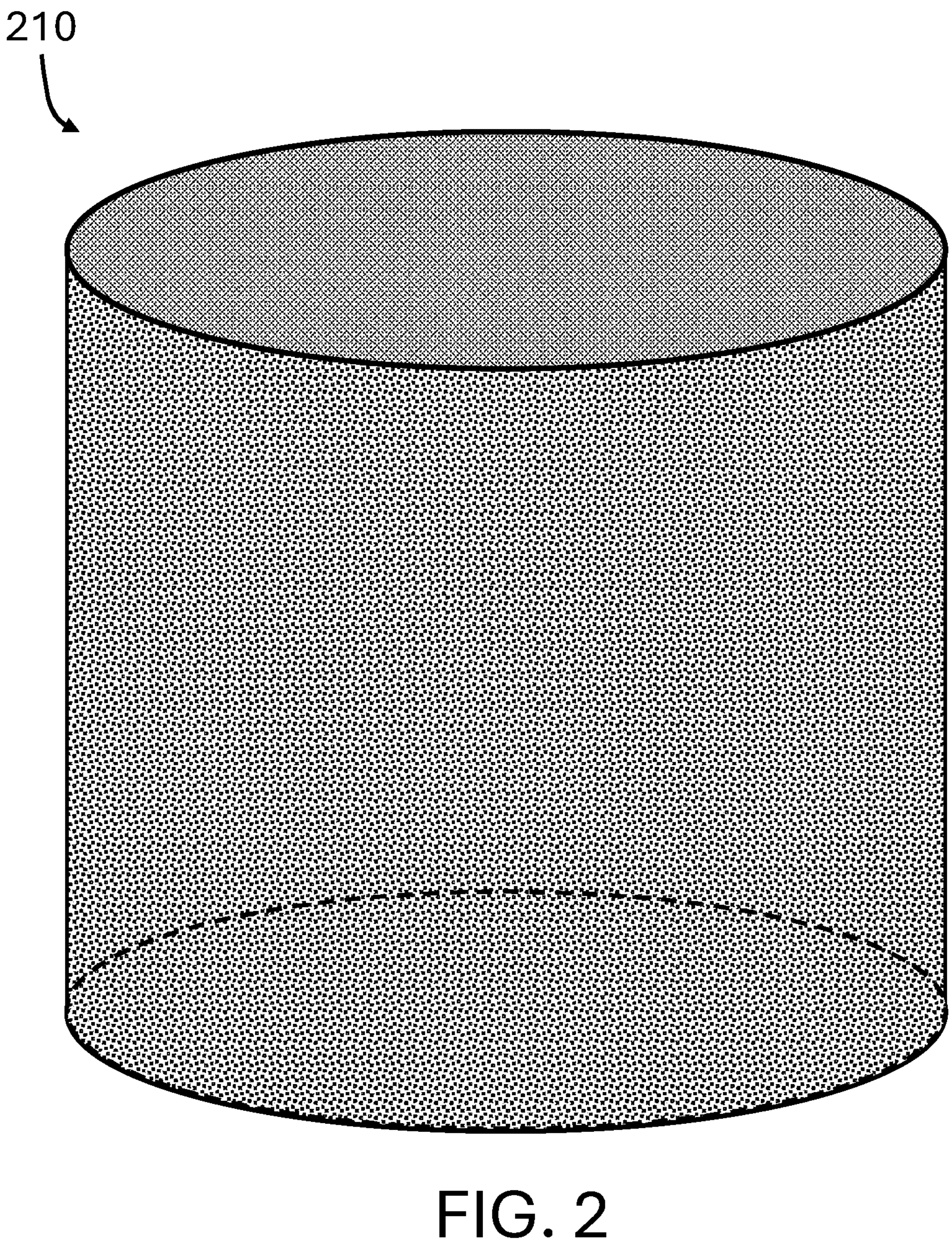
FIG. 2 is a perspective view of grains compressed together into a pressed body, but the grains not yet sintered together, according to an aspect of the present disclosure.

Referring now to FIG. 2, a pressed body 210 is formed from pressing the above-described grains together. The larger/agglomerated grains come together to in turn form larger pores therebetween when pressed together in a pressed body 210. Applicants find that pore size is largely proportional to grain size, as long as the pressed body 210 is not overly pressed. As such, according to an aspect, the grains of the pressed body 210 are pressed together, but not too much-instead, in the pressed body 210, large pores greater than 2 micrometers in size, preferably greater than 3 micrometers, still make up a considerable portion of the pressed body 210, such as at least 2 percent by volume of open porosity of the pressed body 210 (pore-vol %), such as at least 3 pore-vol %, and preferably at least 5 pore-vol %, and/or less than 50 pore-vol %.

For large glass grains, as disclosed herein such as with agglomerated silica or doped-silica grains made from flame hydrolysis, this level of compression in the pressed body 210 amounts to density of the pressed body 210 between 0.3 $g/cm^3$ to 1.5 $g/cm^3$, preferably 0.5 $g/cm^3$ to 1.1 $g/cm^3$, and even more preferably between 0.6 and 0.9 $g/cm^3$. Compression resulting in densities below such ranges may weaken the respective pressed body 210. But compression resulting in densities above such ranges may inadvertently crush or otherwise eliminate large pores in the pressed body 210 as described, which may be desired for reasons as further explained herein.

Pore size and volume may be measured by mercury intrusion porosimetry based on the Washburn equation, such as using commercially available porosimetry tools such as AutoPore V from Micromeritics, where "pore size" as used herein is the "diameter" in the Washburn equation, surface tension is assumed to be 485 dynes/cm unless otherwise specified, and contact angle is assumed to be 130° unless otherwise specified. Furthermore, as may be intuitive, such as when viewing plots of FIGS. 3A-3B, incremental volume of pores and total porosity is limited to pores 0.01 micrometers to 1000 micrometers in size that are open and interconnected (to allow for receipt of mercury), so references herein to volume percent of porosity (pore-vol %) refer to percentage within all open pores of this range, excluding any "pores" less than 0.01 micrometers, closed-off or closed pores, or pores greater than a millimeter in pore size for example. Furthermore, as may be intuitive, Applicants typically extract only a representative cubic centimeter portion of a body to measure pores and porosity via mercury intrusion porosimetry as described. To measure porosity for samples of loose grains, Applicants press the grains to 0.5 g/cc, heat them to only slightly sinter (e.g., about 5% densification), giving strength to the body without significantly altering the corresponding pore distribution. Put another way, if grains in a body are not strong enough for porosimetry, then Applicants slightly sinter the body, to a minimal amount (e.g., 1% to 10% densification) so that the pores can be measured, but not so much as to significantly alter the pore distribution. A partially-sintered body 410 may well be sufficiently strong for mercury intrusion porosimetry, for example.

Figure 3A:
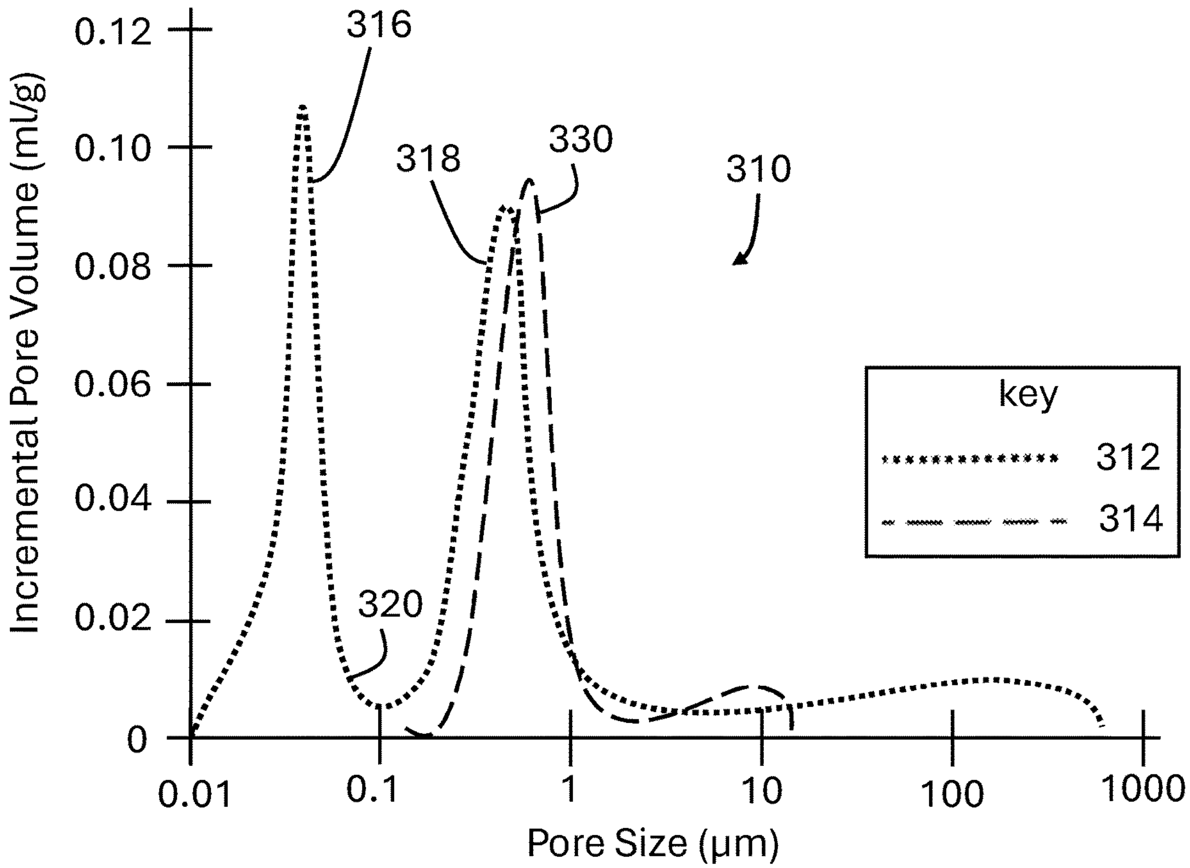
FIG. 3A is a plot of incremental pore volume (y-axis) as a function of pore size (x-axis) for two hypothetical distributions of grains according to an aspect of the present disclosure.

According to an aspect, after agglomeration and compression into the pressed body 210, grains of the pressed body 210 may have a pore size distribution 312 idealized by plot 310 shown in FIG. 3A. Curve 312 is representative of a bi-modal distribution of incremental pore volume as a function of pore size. The curve 312 comprises two spikes 316, 318 or local bell-curve distributions (which may be more skewed or irregular in real-world systems of grains than shown in FIG. 3A; note also that pore size is with log base 10 scale increments) spaced apart from one another by a dip 320 therebetween.

According to an aspect, maximum values in either or each of the two main spikes 316, 318 have an incremental pore volume in milliliters (ml) per gram (g) more than twice that of a local minima of the dip 320 therebetween, such as more than three times, more than four times, more than five times. While the curve 312 has two spikes 316, 318, other curves of incremental pore volume as a function of pore size may have additional spikes as well, where a spike, such as the spike 318, overlays the pore size of interest, which may have a peak or local-maxima value of a pore size greater than 0.5 μm and less than 10 μm, such as greater than 0.6 μm and less than 5 μm, such as greater than 0.7 μm and less than 2 μm, in contrast to other spike(s) outside such range.

According to an aspect, spacing apart of spikes 316, 318 with the dip 320 therebetween of the pressed body 210 may be utilized during a heat treatment process of the pressed body 210. Applicants have found that grains of the pressed body 210 sinter and melt as a function of size, with smaller grains fusing and melting first. As such, Applicants discovered that small pores of the pressed body 210 may be collapsed and closed before larger pores close during a heat treatment process, as temperatures heat up the grains.

Figure 4:
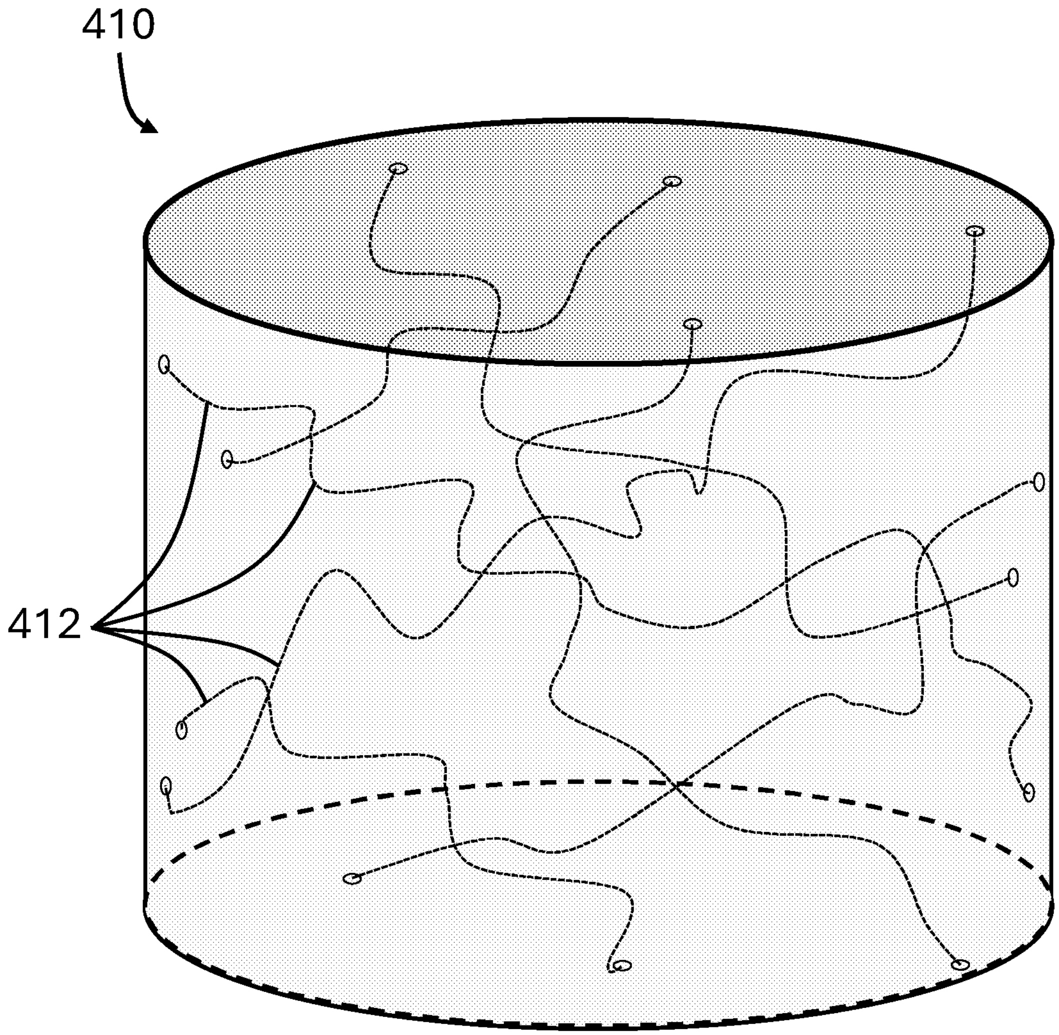
FIG. 4 is a perspective view of a partially-sintered body with interconnected open porosity according to an aspect of the present disclosure.

Applicants use difference in time-dependent fusing and melting phenomena of small-mode versus large-mode grains to achieve a partially-sintered body 410, as shown in FIG. 4. More specifically, heating of the partially-sintered body 410 is halted or interrupted after the small grains sinter or melt and small pores corresponding to the spike 316 close, but before the large grains and corresponding large pores of the spike 318 are much impacted.

With sintering this way, the partially-sintered body 410 includes a network of open and interconnected large pores mainly or only, with fewer if any interconnected or open small pores below a threshold (when compared to pore distribution 312 of the pressed body prior to the partial sintering). The curve 330 in FIG. 3A may be conceptually representative of the partially-sintered body 410, where pores below a threshold (e.g., 0.3 μm) are closed after the partial sintering, while the larger pores remain open and interconnected.

Figure 3B:
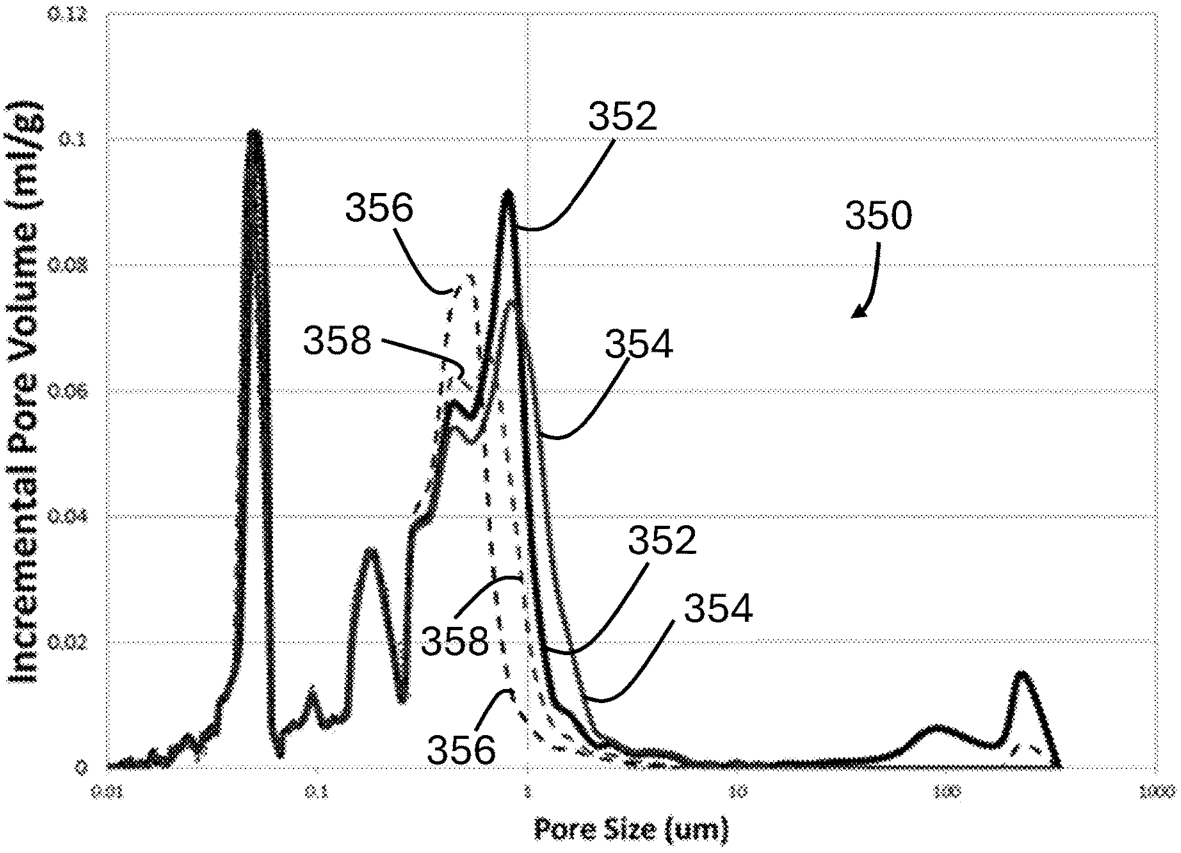
FIG. 3B is a plot of incremental pore volume as a function of pore size for four pressed bodies, varying agglomeration and pressure of compression, according to an aspect of the present disclosure.

While plot 310 in FIG. 3A is conceptual, the plot 350 of FIG. 3B is measured data from four samples. Pressure of compression and agglomeration are two ways to influence distribution of pore size as a function of incremental pore volume, as shown in the plot of FIG. 3B. Agglomeration conditions and compression pressure were changed to show impact on the resulting pressed body (see generally pressed body 210). Incremental pore volume as a function of pore size shown as curve 352 (darker solid line) corresponds to titania-doped-silica grains from flame hydrolysis pressed into a body under 100 pounds per square inch (psi; where 100 psi is about 0.69 MPa). Curve 354 shows the same grains and the same pressing pressure, but after first rolling the grains to agglomerate grains. While much of the two curves 352 and 354 overlap one another, the curve 354 shifts toward greater pore size in the spike overlaying approximately 1 micrometer pore size. Similarly, curve 356 is to grains of the same material, pressed to 150 psi (about 1.03 MPa), and curve 358 is to the same grains and pressure, but with prior rolling agglomeration.

The two sets of curves in FIG. 3B demonstrate the same relationship, that agglomeration shift the pore size distribution of the larger pores in the larger-pore-size direction of the plot 350. Also, notably, higher pressure (150 psi versus 100 psi) drives down the spike overlaying about 1 micrometer and shifts the spike toward the smaller-pore-size direction of the plot 350. As such, depending upon the grains and materials, enough pressure should be applied that the pressed body 210 holds together and can be partially sintered to form the partially-sintered body 410, but not so much as to close off or overly close larger pores as disclosed herein.

As indicated, the partially-sintered body 410 of FIG. 4 is an intermediate body between the pressed body 210 of FIG. 2 (predecessor to partially-sintered body 410) and the body 110 of material of FIGS. 1A and 1B (product of partially-sintered body 410). The partially-sintered body includes passages 412 passing fully through and throughout the partially-sintered body 410 formed by interconnection of large, open pores corresponding to the larger grains that were not significantly sintered or melted during the partial-sintering (as opposed to smaller grains and pores thereof). The passages 412 extend fully through and connect opposing faces of the partially-sintered body. The passages 412 are tortuous—on cannot see lengthwise through the partially-sintered body 410 by way of the passages 412. As such, the passages 412 may not provide line of sight fully through a center of the partially sintered body 410. That said, the passages 412 may provide a clear and relatively low-pressure route (low head loss) through the partially-sintered body 410, allowing for infusion of the partially-sintered body 410 with fluid dopant or fluid-carried dopant (i.e. gaseous- or vapor- as well as liquid-dopants).

Such vapor- or liquid-dopant may include those that may otherwise quickly vaporize and leave molten material at very high temperatures as disclosed herein, such as volatile dopants that may be otherwise difficult to dope into glass, glass-ceramic, or polycrystalline ceramic. For example, a fluid dopant may include sulfur-containing or -based dopants, nitrogen-containing or -based dopants (e.g., ammonia), water-containing or based dopants (e.g., hydroxide), fluorine, halides, such as rare-earth halides. The fluid dopants may supplement or augment solid-form cation dopants integrated during flame hydrolysis or otherwise, such as carrying additional titania into a partially-sintered body of titania-doped silica, such as titania carried by chlorine (e.g., $TiCl_4$) or nitrogen, or sulfur. The fluid may include gas carrying rare earths and other dopants, such as erbium (e.g., $ErCl_3$; $Er(NO_3)_3 \cdot 5H_2O$), neodymium (e.g., $NdCl_3$, neodymium(III) sulfide), phosphorus-carrying fluid, fluorine-carrying fluid, lead-carrying fluid. The fluid dopant may include combinations of dopants, such as water and germanium for example. Water may lower liquidus viscosity and melting or sintering temperatures of silica-based grains while germanium may augment refractive index of the resulting body for example.

According to an aspect, after the partially-sintered body 410 is sufficiently infused with fluid dopant, the partially-sintered body 410 may then be further or fully sintered. Environmental pressure, such as sintering chamber pressure, may be used to hold the fluid dopant within the partially-sintered body 410 during the further sintering.

For example, Applicants have made doped glass bodies using the processes disclosed herein. The glass is silica based and include titanium as a cation dopant. Grains of the doped silica were made by flame hydrolysis. Pressing and partial-sintering was performed as disclosed herein, where open, interconnected large pores were infused with water or hydroxide vapor. The result was a highly uniform doped-, sintered-body free of striations in the cation dopant with a consistent thermal coefficient of expansion throughout the doped-, sintered-body, as evidenced by temperature of zero crossing (i.e. at which thermal expansion is 0) of within 1° C. (plus/minus) off baseline temperature, such as within less than 0.5° C., and within less than 0.2° C. in variation throughout this doped-, sintered-body and parts made therefrom. Further, the hydroxyl groups were also evenly distributed throughout the doped-, sintered-body and in high concentration, less than 20 parts hydroxyl per million parts body (ppm) peak to valley variation. Furthermore, Applicants have found this process can be used to press and infuse dopant into the grains in less than 2 days for large, pressed bodies, including 4 kg pressed bodies and larger. These properties were measured on a 6 mm by 100 mm by 100 mm sample cut from the glass. Applicants contemplate that other dopants (e.g., cation dopants and/or fluid dopants) as disclosed herein may likewise be sintered into a body of material disclosed herein.

According to an Aspect A1 of the present disclosure, a method of making a doped-, sintered-body (see doped-, sintered-body 110 FIG. 1), comprises a step of pressing together grains of an inorganic material (e.g., glass grains) to form a pressed body (see pressed body 210 FIG. 2) without collapsing at least some pores between the grains. Pressing may be sufficient so that the pressed body holds together, such as when handled, removed from a press or mold, and/or moved to a sintering furnace; but not pressed so much so as to crush large, open pores within the pressed body, as explained herein. The method further includes a step of only partially-sintering the pressed body. This only partial sintering should be conducted to close smaller pores and correspondingly melt smaller grains within the pressed body, but not melt the larger grains or close the larger pores. As such, the partial sintering forms a partially-sintered body (see partially-sintered body 410) with open and interconnected (larger) pores throughout the partially-sintered body. During this only partially-sintering, at least some of the grains fuse to one another and some of the pores collapse. However, however following the only partial-sintering the partially-sintered body still comprises open and interconnected pores throughout the partially-sintered body. The method still further includes a step of moving a fluid dopant into the partially-sintered body by way of the open and interconnected pores. For example, the fluid dopant may be a vapor dopant, such as a volatile organic compound, sulfur- or nitrogen-containing gas, water-based gas, metal halide, or other fluid dopant as disclosed herein. Lastly, the method of Aspect A1 includes a step of further sintering the partially-sintered body to collapse the open and interconnected pores with the fluid dopant therein, to make the doped-, sintered-body. The further sintering may be performed under pressure (e.g., hot isostatic pressing) to collapse blisters or seeds in the doped-, sintered-body, where the fluid dopant accordingly collapses into and becomes fully integrated within a molecular network of the doped-, sintered-body.

According to an Aspect A2, the method of Aspect A1 may be such that pores of pore size less than 0.5 micrometers are collapsed during the step of only partial sintering, and before the step of moving of the fluid dopant into the open and interconnected pores of the partially-sintered body. This collapsing includes at least some such pores, but need not include all pores less than 0.5 micrometers in size. This collapsing may be measured by a change in mercury infusion porosimetry results for pores having pores size less than 0.5 micrometers before and after the partial-sintering. According to an aspect, the percentage of pores of pore size less than 0.5 micrometers as a percentage of all pores (that are open, and within the 0.01 μm to 1 mm range) is decreased via the step of (only) partial sintering, such as by at least 5% (e.g., from 50 pore-vol % to less than 45 pore-vol %), by at least 10%, and/or to less than 50 pore-vol %, such as less than 25 pore-vol %, such as less than 10 pore-vol % (see generally FIG. 3A and corresponding written description).

According to an Aspect A3, the method of Aspect A1 or A2 may be such that the pores that collapse during the only partial sintering are smaller than the pores that remain in the partially-sintered body. With the smaller pores closed and the larger open and interconnected pores remaining therein, the partially-sintered body has surface area therein of less than 10 $m^2/g$, such as less than 6 $m^2/g$, such as less than 5 $m^2/g$, such as less than 4 $m^2/g$, such as less than 3 $m^2/g$, and/or at least 0.2 $m^2/g$, such as at least 0.5 $m^2/g$—i.e. a relatively low surface area (compared to un-sintered grains), and still includes the network of open and interconnected pores. According to such an aspect, prior to the partial sintering, the pressed body may have surface area therein (i.e. in terms of open and connected pores between grains of different sizes) of greater than 3 $m^2/g$, such as greater than 5 $m^2/g$, such as greater than 10 $m^2/g$, and/or less than 20 $m^2/g$. According to such an aspect, after the step of further sintering, the doped-, sintered-body may have surface area therein (i.e. in terms of open and connected pores between grains of different sizes) of less than 3 $m^2/g$, such as less than 1 $m^2/g$, such as less than 0.1 $m^2/g$, such as fully sintered and densified and only closed porosity if any porosity, such as essentially zero porosity.

According to an Aspect A4, the method of any one of Aspects A1 to A3 may be such that the open and interconnected pores throughout the partially-sintered body are such that greater than 3 percent by volume of the pores (i.e. pore-vol %) is of pores greater than 3 micrometers in pore size, again when measured via mercury intrusion porosimetry of open pores between 0.01 micrometers to 1000 micrometers in pore size. Other pore-vol % values and pore size thresholds are disclosed herein. For example, according to an aspect, the partially-sintered body 410 may comprise greater than 3 pore-vol % pores greater than 1 micrometer in size, such as greater than 5 pore-vol %, greater than 7 pore-vol %, greater than 10 pore-vol % greater than 1 micrometer in size, and/or less than 100 pore-vol % of the partially-sintered body 410; or preferably greater than 3 pore-vol % pores greater than 3 micrometers in size, such as greater than 5 pore-vol %, greater than 7 pore-vol %, greater than 10 pore-vol % of pores greater than 3 micrometers in size, and/or less than 100 pore-vol % of the partially-sintered body 410; or greater than 3 pore-vol % pores greater than 5 micrometer in size, such as greater than 5 pore-vol %, greater than 7 pore-vol %, greater than 10 pore-vol % greater than 5 micrometer in size, and/or less than 100 pore-vol % of the partially-sintered body 410. According to an Aspect A7', the method of any one of Aspects A1 to A6 may be such that the open and interconnected larger pores of the pressed body 210 are such that those greater than 3 micrometers in size form more than 5 pore-vol % of the pressed body 210. And/or, according to an aspect, the pressed body 210 may comprise greater than 3 pore-vol % pores greater than 1 micrometer in size, such as greater than 5 pore-vol %, greater than 7 pore-vol %, greater than 10 pore-vol % greater than 1 micrometer in size, and/or less than 100 pore-vol % of the pressed body 210; or preferably greater than 3 pore-vol % pores greater than 3 micrometers in size, such as greater than 5 pore-vol %, greater than 7 pore-vol %, greater than 10 pore-vol % of pores greater than 3 micrometers in size, and/or less than 100 pore-vol % of the pressed body 210; or greater than 3 pore-vol % pores greater than 5 micrometer in size, such as greater than 5 pore-vol %, greater than 7 pore-vol %, greater than 10 pore-vol % greater than 5 micrometer in size, and/or less than 100 pore-vol % of the pressed body 210.

According to an Aspect A5, the method of any one of Aspects A1 to A4 may be such that the pores of the pressed body are sized such that the pores comprise a spike in terms of incremental pore volume as a function of pore size with a peak of the spike positioned between 0.5 micrometers and 10 micrometers in pore size. Put another way, when plotting the incremental pore volume of the respective body on a vertical or Y-axis as a function of pore size on a horizontal or X-axis (see, e.g., FIGS. 3A and 3B), a peak or local maximum of a spike is centered over a pore size within the above range. For example, the spike may be one of five tallest spikes, four, three, two, or even the one tallest spike in the pore size distribution spanning from about 0.01 micrometers to 1 mm, as shown on a log-base-10 scale in FIGS. 3A and 3B. As indicated herein, mercury intrusion porosimetry may be used to gauge pore sizes unless otherwise specified; such as for really small pores or less solid bodies, gas adsorption may be useful, as well as x-ray tomography or scanning electron microscopy and transmission electron microscopy. This peak of the spike (e.g., one of three or two tallest spikes) may be positioned over 0.5 micrometers to 5 micrometers, such as 0.5 micrometers to 1.5 micrometers, such as over 0.7 micrometers to 1.3 micrometers along the pore size distribution (x-axis in FIGS. 3A and 3B).

According to an Aspect A6, the method of Aspect A5 may be such that the pore size distribution further comprises a dip in terms incremental pore volume adjoining the spike of Aspect A2, lesser than the spike in terms of pore size, where the peak of the spike comprises an incremental pore volume at least twice (e.g., three-times, four-times, five-times, ten-times) a local minima of the dip. The peak and the local minima may be within 1 micrometer in pore size of one another along the pore size distribution (x-axis in FIG. 3A), such as within 0.7 micrometers, such as within 0.5 micrometers. Likewise, the spike may further include a second dip on a side thereof (in pore size) opposite that of the dip, and the spike may comprise an incremental pore volume at least twice the local minima of the second dip (e.g., three-times, four-times, five-times, ten-times). Further still, the pore size distribution may comprise a second spike with a pore size less than the dip but an incremental pore volume more than twice the local minima of the dip (e.g., three-times, four-times, five-times, ten-times). This second spike may overlay pore sizes less than the pore sizes overlayed by the spike of Aspect A5 and the second spike may decrease in incremental pore volume (magnitude thereof) during the partial sintering, decreasing more than that of the spike of Aspect A5.

According to an Aspect A7, the method of any one of Aspects A1 to A6 may further comprise a step of agglomerating the grains with one another to increase size thereof prior to the pressing. The agglomerating may be performed by rolling the grains together in a barrel or drum, by vibration, spraying dry, blending the grains together in a V-shaped tumbler (so-called v-blending), or otherwise. For example, grains may be agglomerated together to form larger grains, such as agglomerated to greater than 0.15 g per cubic centimeter (g/cc), such as greater than 0.2 g/cc, such as greater than 0.25 g/cc, or even greater than 0.3 g/cc for grains of glass, such as grains of silica or doped-silica as disclosed herein. Agglomeration may be used to achieve pore size distributions as disclosed herein, such as the pore size distribution of Aspect A2 or A3. That said, grains may be otherwise filtered or grown to achieve such a distribution.

According to an Aspect A8, the method of Aspect A7 may be such that prior to the agglomerating at least some of the grains have a surface area greater than 20 $m^2/g$, and wherein after the agglomerating at least some of the grains have a surface area less than 10 $m^2/g$. For example, a mean surface area of the grains and/or a surface area internal to a body as disclosed herein (e.g., pressed body with agglomerated grains therein; partially-sintered body), may be less than 20 $m^2/g$, such as less than 15 $m^2/g$, such as less than 10 $m^2/g$, while still having an open, interconnected network of pores, especially including large pores as disclosed herein. Pressure to press the grains together to form the pressed body 210 may be less than 10 MPa, such as less than 5 MPa, and/or at least 0.1 MPa, such as at least 0.25 MPa, where grains of the pressed body 210 hold together during the partial-sintering but pores therein, especially larger open and interconnected pores associated with agglomerated grains, sufficiently remain open and not collapsed.

According to an Aspect A9, the method of any one of Aspects A1 to A8 may be such that the doped-, sintered-body is greater than 10 g in mass, such as greater than 100 g in mass, such as greater than 500 g in mass, such as greater than 1 kg in mass, such as greater than 3 kg, such as greater than 5 kg, such as greater than 10 kg, and/or no more than 100 metric tons. Such mass may not otherwise be possible or feasible with other methods of doping or making glass at least because fluid-carried dopants may not be infusible into to such large bodies. That said, Applicants do not disclaim such methods unless expressly disclaimed. Furthermore, according to an aspect, such large bodies (e.g., 3 kg) may have a squat profile as disclosed herein, such as overlaying a cube-shaped volume as disclosed above, in contrast to flat sintered sheets for example. The squat profile with large mass may allow machining of the partially-sintered body or doped-, sintered-body to make large glass parts that have uniform doping and consistent thermal and optical properties throughout the parts, free of inclusions or other discontinuity that may form between sheets of glass melted together into larger parts.

According to an Aspect A10, the method of any one of Aspects A1 to A9 may further comprise a step of forming the grains by flame hydrolysis. As disclosed herein, gases carrying elements (e.g., silicon, aluminum, zirconium, niobium, tantalum, titanium, germania-doped silica, boria-doped silica, chromium, iron, zinc, phosphorus, lead, tungsten, fluorine) may be oxidized in a flame and deposited on a target, such as collected on a rod, in a vat, on a plate, or other target, and/or may be agglomerated in the process prior to collection and/or may be agglomerated afterward, as disclosed herein. Grains of such materials may be pressed together to form a pressed body and then sintered as disclosed herein. Flame hydrolysis may be a good process for making grains for materials that benefit from few if any impurities. For example, of grains and corresponding materials of bodies disclosed herein may comprise less than 0.05 mol % iron oxide (where $Fe_2O_3$ is the representative oxide as used herein for iron as a constituent), such as less than 0.02 mol % iron oxide, for materials where iron is an impurity. That said, Applicants contemplate other ways too of making grains that may be processed as disclosed herein and formed into a doped-, sintered-body. For example, materials may be ground down into grains, combined with grains of other materials, mixed together, pressed together, and then may be doped and sintered as disclosed herein. Such materials may include glasses, glass-ceramics, and ceramics, such as polycrystalline ceramics (e.g., lithium-containing ceramics, such as garnet). The processes disclosed herein may be useful for vapor- or liquid-doping such materials once grains have been sized, pressed together, and only partially sintered, as disclosed herein.

According to an Aspect A11, the method of any one of Aspects A1 to A10 may be such that the grains comprise a metal-doped silica, such as where the metal is a metal cation. The metal of the metal-doped silica may be a metal as disclosed herein, such as germanium, cerium, titanium, or others explicitly disclosed herein or otherwise. This metal-doped silica may then be subsequently doped with a fluid dopant, as disclosed herein, such as one that may otherwise be hard to dope into material because the fluid dopant may be volatile at sintering temperatures of the metal-doped silica. Put another way, the fluid dopant may be hard to infuse into the inorganic material of the grains because the dopant may vaporize at melting temperatures of the inorganic material and evaporate or otherwise leave the inorganic material while molten or sintering, prior to solidification. The fluid dopant may evaporate from molten material. For example, the fluid dopant may be or comprise nitrogen, sulfur, hydrogen, fluorine, chlorine, bromine, or other dopants (e.g., phosphorus trichloride). Such fluid dopants may be used to influence properties of a resulting materials, such as changing refractive index, liquidus viscosity, thermal expansion characteristics, optical transmission profile, antimicrobial properties, or other attributes. As such, the silica of Aspect A10 may be doped by the metal cation dopant and then further doped by such a fluid dopant. Furthermore, according to an Aspect A11, the method may be such that the fluid dopant more specifically comprises a metal halide, such as fluorine, chlorine, bromine, iodine, and/or astatine bonded to a metal such as erbium, ytterbium, neodymium, thulium, holmium, germanium, titanium. Applicants further contemplate still other metals may be carried by such a fluid dopant into the partially-sintered body 410, as disclosed herein, such as lanthanum, cerium, noble metals (e.g., gold), bismuth, praseodymium, or other metals.

According to an Aspect A12, the method of any one of Aspects A1 to A11 may be such that the partial sintering step is performed at a furnace temperature that is less than the furnace temperature of the further sintering step, such as by at least 25° C., at least 50° C., at least 75° C., and/or no more than 1000° C. The increase in temperature during the further sintering step may help sinter larger grains and close off and collapse the open and interconnected larger pores of the partially-sintered body with the fluid dopant therein, so that the fluid dopant infuses into the fully sintered material, which becomes the doped-, sintered-body. That said, Applicants contemplate that a furnace temperature need not be raised for the further sintering, such as if the temperature during the partial sintering is sufficient to sinter the larger grains in time, but the partial sintering is interrupted before closing off the open and interconnected larger pores so that the fluid dopant may be provided therein prior to the further sintering.

According to an Aspect A13, the method of any one of Aspects A1 to A12, may further comprise a step of machining the partially-sintered body 410 prior to the infusing. For example, the partially-sintered body 410 may be cut, drilled, polished, or otherwise machined (see generally partially-sintered body 510 of FIG. 5A with hole 512 drilled therein). The machining may remove material from the partially-sintered body, such as at least 3 percent of the volume (vol %) thereof, such as at least 5 vol %, at least 10 vol %, and/or no more than 90 vol %. Machining the partially sintered body may form the body to a “near-net-shape” of a desired finished geometry, prior to the step of further sintering. Then, once in the near-net-shape geometry, the step of further sintering may also dull or fully remove any cracks, striations, pits, or other features of the machining, potentially removing a step polishing, such as if the machining were to be performed upon the fully-sintered body (i.e. the doped-, sintered-body 110). Furthermore, machining features into the partially-sintered body, as opposed into the pressed body, may allow for more accurate formation of those features in the fully-sintered body because such features might otherwise distort during the longer sintering process.

According to an Aspect A14 and referring to FIG. 5A for example, the method of any one of Aspects A1 to A13 may be such that the machining comprises drilling a hole 512 in the partially-sintered body. The hole 512 may be round in cross section, and may have a near-constant cross-section lengthwise through the partially-sintered body. That said, the hole may have other geometries as well, as cone-shaped and/or only partially through the body 510, elliptical in cross-section, more complex in geometry, or otherwise. For a round hole as shown in FIG. 5A, the hole 512 may have a diameter of at least 5 mm and extend lengthwise through the partially-sintered body 510, such as at least 10 mm, such as at least 20 mm, such as at least 50 mm, such as fully through the partially-sintered body 510. This hole may shrink during the step of further sintering, but perhaps not considerably, such as the diameter shrinking less than 10%, such as less than 5%, such as less than 3% due to the near-net-shape of the partially-sintered body.

According to an Aspect A15, the method of Aspect A14 may further comprise a step of inserting a second body into the hole. The second body may comprise another inorganic material that differs from the inorganic material of the (first) partially-sintered body in terms of refractive index. For example, the second body may be fully sintered before the second body is inserted into the hole, such as when the vapor dopant is not to be doped into the second body. Or the hole in the (first) partially-sintered body may be filled by another, second partially-sintered body of material that may then be doped by a fluid dopant along with the (first) partially sintered body and further sintered together with and into the (first) partially-sintered body. Such combinations may be used to make preforms for an optical fiber, for example, with the (first) partially-sintered body (or doped-, sintered-body) forming the “cladding” of the preform and the second body forming a “core” of the preform. While the hole 512 is filled in FIG. 5B, Applicants contemplate that the hole 512 or other holes or features formed in the partially-sintered body 510 may be left open and formed into the doped-, sintered-body as a hollow region, such as in a preform for a hollow-core fiber or within capillary or nested-capillary structures within a preform, to make such features an optical fiber drawn from the preform.

According to an Aspect A16, the method of any one of Aspects A1 to A15 may further comprise a step of first heating to a melting temperature and then drawing a fiber 710 from a lengthwise end of the doped-, sintered-body, wherein the fiber has a length L2 greater than 1 m, such as greater than 10 m, such as greater than 1 km, such as greater than 10 km, as may be wound on a reel for example, and/or the length L2 may be less than 500 km. While the fiber 710 in FIG. 5C is drawn from the doped-, sintered-body formed from the (first) partially-sintered body 510 and second body 610 of FIG. 5A to 5B, Applicants contemplate that fibers of a single glass may also be drawn from doped-, sintered bodies as disclosed herein, such as inorganic fibers for fiberglass or continuous, interwoven fibers of polymer matrix composites.

According to an aspect B1, a partially-sintered body comprises grains of inorganic material sintered to one another and pores adjoining the grains. The pores are connected to one another and provide open passages extending throughout the partially-sintered body. The partially-sintered body is squat, fully overlaying a cube-shaped volume therein with edge length of greater than 10 mm, such as greater than 2 cm, such as greater than 4 cm, such as greater than 5 cm, such as greater than 10 cm, and/or no more than 20 m. The partially-sintered body further comprises a fluid dopant extending throughout the partially-sintered body by way of the passages. The fluid dopant may be a vapor dopant. The passages may be homogenously distributed throughout the partially-sintered body and the fluid dopant may likewise be homogeneously distributed throughout the partially-sintered body by way of the passages. According to an aspect, the fluid dopant may flow entirely through the body and may likewise be drawn into the body, such as to a center of the body in concentration therein that matches the concentration of the fluid dopant elsewhere in the partially-sintered body.

According to an Aspect B2, the partially-sintered body of Aspect B1 may be such that the pores are such that more of the pores, in terms of pore incremental volume of the partially-sintered body, have a pore size greater than 0.5 micrometers than less than 0.5 micrometers, such as more having a pore size greater than 0.6 micrometers than less than 0.6 micrometers, such as more having a pore size greater than 0.7 micrometers than less than 0.7 micrometers. According to an aspect, pores having a pore size greater than 0.5 micrometers make up pore incremental volume of the partially-sintered body more than twice that of pores having a pore size less than 0.5 micrometers, such as more than three times, more than four times.

According to an Aspect B3, the partially-sintered body of Aspect B1 or B2 may be such that the pores are such that greater than 5 percent of the partially-sintered body is of pores greater than 3 micrometers in size, as with Aspects A7 and A7' and any such relationship as disclosed.

According to an Aspect B4, the partially-sintered body of Aspect B1, B2, or B3 may be such that the grains comprise glass. The glass may comprise doped-silica. The fluid dopant may comprise a vapor. The vapor may comprise a metal halide.

According to an Aspect C1, a body, such as a doped-, sintered-body of inorganic material, such as a glass body, boule, preform, part, etc., comprises a volume. More specifically, the volume is thick, wide, and long such that the volume at least overlays a cube geometry having an edge length greater than 2 cm. As explained herein, the cube geometry may not be an actual physical structure in the body, but merely defining a space over which material of the body overlays to at least in part quantify the thick thickness, wide width, and long length of the body. The body further comprises a network of grains of inorganic material fused to one another filling the volume. The network of grains is an interconnected arrangement of the grains, such as where the grains are partially fused to one another or fully melted into one another. The grains may be or comprise crystals, where only portions of the grains fuse to one another such that the body is that of a polycrystalline ceramic or glass-ceramic; or the grains may comprise glass and fuse to one another to form a glass ceramic or an amorphous body where at least some of individual grains may be difficult or impossible to discern from one another. According to such an aspect, the inorganic material comprises a melting temperature, which for glass and for purposes of the present disclosure may be considered the so-called liquidus temperature, the temperature at which crystals fully melt away as temperature is increased from room temperature, and may be measured in accordance with ASTM C829-81 (2015), titled “Standard Practice for Measurement of Liquidus Temperature of Glass by the Gradient Furnace Method.” According to such an aspect, the dopant may be uniformly and homogenously infused into the network of grains of inorganic material throughout the volume, as opposed to highly concentrated near surfaces and little present at greater depths within the network. As explained herein, the present technology facilitates such uniform and homogenous infusion by way of the open and interconnected network of pores, which may have correspondingly low surface area due to sizing and selection of grains and closure of smaller pores via partial sintering-dopants may otherwise get locally concentrated in and clog smaller pore networks with more surface area, resulting in inhomogeneity and nonuniformity. That said, Applicants contemplate use of the present technology that may not provide uniform or homogenous infusion, such as purposeful doping of only a portion of material or doping gradient for example. Furthermore, according to such an aspect, the dopant may be volatile such that the dopant alone vaporizes and evaporates at the melting temperature of the inorganic material. Such dopants (e.g., sulfur, nitrogen, chlorine) otherwise may be difficult to infuse because such dopants quickly move through and escape from molten material, especially molten material at high melting temperatures, such as in the high hundreds to over a thousand degrees Celsius. That said, according to such an aspect, the dopant is trapped in the network at a concentration greater than 50 parts of the dopant per million parts of the body. More specifically, the dopant is trapped in the network, incorporated into the network, and dissolved into the network. Further, the uniformity and homogeneity of the dopant is such that the dopant is within 100 parts of the dopant per million parts of the body of an average concentration thereof throughout the volume.

According to an Aspect C2, the body of Aspect C1 may be such that the dopant comprises an element of the group consisting of nitrogen, sulfur, fluorine, chlorine, bromine, iodine. Various examples of such dopant materials, such as metal halide gases, ammonia, etc., are provided in the present disclosure. That said, Applicants contemplate other elements and dopants may be used as well, as presently disclosed.

According to an Aspect C3, the body of Aspect C1 or C2 may be such that greater than 100 parts of the dopant per million parts of the body, such as greater than 250, such as greater than 500, such as greater than 750, such as greater than 1000, and/or less than 20,000 parts of the dopant per million parts of the body are infused into the grains throughout the volume.

According to an Aspect C4, the body of any one of Aspects C1 to C3 may be such that the dopant is within 80 parts of dopant per million parts body of an average concentration thereof throughout the volume, such as within 60, such as within 40, such as within 25, such as within 20 parts of dopant per million parts body of an average concentration thereof throughout the volume, and/or where there may be at least some measurable variation. According to such an aspect, the body may be such that the dopant is within 20% of an average concentration in parts of dopant per million parts body throughout the volume, such as within 15%, such as within 10%, such as within 5%, such as within 3% of an average concentration in parts of dopant per million parts body throughout the volume, and/or where there may be at least some measurable variation.

According to an Aspect C5, the body of any one of Aspects C to C4 may be such that the grains are fused to one another such that the network is amorphous. Put another way, the network may be non-crystalline, lacking long-range atomic order or repetition. That said, and as explained herein, other aspects of the present disclosure may include grains that retain or develop a crystalline structure, such as with doped-, sintered-ceramic or glass-ceramic or other inorganic materials.

According to an Aspect C6, the body of any one of Aspects C1 to C5 may be such that the grains comprise alumina, silica, germania, and/or titania. For example, the grains may comprise silica, doped-silica, and/or a silicate glass, alumina, aluminate glasses, titanate glasses, alumino-silicate glasses, germanium-doped silica, silica-containing glass-ceramic, polycrystalline alumina ceramic, etc. That said, the grains may comprise additional constituents, as disclosed herein.

According to an Aspect C7, the body of any one of Aspects C1 to C6 may be such that the melting temperature of the inorganic material is greater than 1000° C., at atmospheric pressure (101.325 kPa). Put another way, for glasses and glass grains disclosed herein, such as silica, germanium-doped silica (e.g., 1-15 wt % germania and the rest mainly silica), the melting temperatures may span a range, and the melting temperature of interest may be more specifically the respective liquidus temperature, as defined herein. Melting temperatures of the inorganic material may exceed 800° C., 1000° C. (as with Aspect C7), 1100° C., 1200° C., or even higher temperatures.

According to an Aspect C8, the body of any one of Aspects C1 to C7 may be such that the dopant alone comprises a fluid at room temperature (25° C.) and atmospheric pressure, i.e. is a fluid dopant. The fluid may be a vapor, such as ammonia gas or metal halide gas, or a liquid-either of which may be moved into the (large) open and interconnected pores of the partially-sintered body 410, as disclosed herein. Pressure may be used to facilitate the movement of the dopant into the pores. However, the use of large pores with relatively low surface area likewise facilitate the movement. As disclosed herein, once within the open and interconnected pores, the dopant may be held therein by sealing off the pores and/or by pressure during the sintering. Furthermore, with the further sintering, the open and interconnected pores may collapse upon the dopant, and facilitate absorption of the dopant into and throughout the sintered body.

According to an Aspect C9, the body of any one of Aspects C1 to C8 may be such that the dopant alone (e.g., germanide halide such as $La_3Cl_2Ge_3$, water or hydroxyl, ammonia), has a vapor pressure of greater than 10 pascal at a temperature less than the melting temperature of the inorganic material of the body. As such, the dopant may be hard to contain within molten inorganic material, and may bubble out of a melt. By contrast, the solid framework of the partially sintered material may better hold in such dopants, where the dopants that become absorbed into the network of grains of inorganic material during the further sintering.

According to an Aspect C10, the body of any one of Aspects C1 to C9 may be such that the dopant alone vaporizes and has a vapor pressure of greater than 10 pascal at a temperature less than 0.7 times the melting temperature of the inorganic material, under atmospheric pressure. Put another way, the dopant of may be vaporize and evaporate at temperatures far lower than the melting temperature of the inorganic material (i.e. less than 0.7 times that).

According to an Aspect C11, the body of any one of Aspects C1 to C10 may be such that the edge length of the cube geometry is greater than 6 cm. According to such an aspect, the presently disclosed technology may be used to make even larger bodies, such as bodies that overlay a cube geometry with edge length greater than 10 cm, such as greater than 15 cm, and/or no more than 10 m. According to such an aspect, the body may have a volume (regardless of shape) greater than 27 $cm^3$, such as greater than 125 $cm^3$, such as greater than 512 $cm^3$, such as a greater than 1000 $cm^3$, and/or no more than 1000 $m^3$.

According to an Aspect C12, the body of any one of Aspects C1 to C11 may be such that the volume thereof is fully densified i.e. to remove almost all internal pores, gaps, voids, bubbles, such that the resulting body has roughly a maximum density and is completely solid (allowing for some seeds or other small inclusions).

According to an Aspect D1 a body, similar to the body of Aspect C1, comprises a volume quantified in terms of mass as opposed to geometry, where the mass of the volume is greater than 3 kg, such as greater than 5 kg, such as greater than 10 kg, such as greater than 25 kg, such as greater than 50 kg, such as a greater than 100 kg, and/or no more than a megagram. Such a body may have a length far greater than width and thickness thereof, such as an optical fiber for example. The volume may too have a geometry as disclosed herein, such as dimensions of those in Aspects C1 and C11 for example. According to such an aspect, the body comprises a network of grains of inorganic material fused to one another filling the volume, where the inorganic material comprises a melting temperature (e.g., liquidus temperature for glass), and a dopant uniformly and homogenously infused into the network of grains of inorganic material throughout the volume. The dopant may be volatile such that the dopant alone vaporizes and evaporates at the melting temperature of the inorganic material. However, the dopant is trapped in the network of the inorganic material at a concentration greater than 50 parts of the dopant per million parts of the body. The uniformity and homogeneity of the dopant in the network of grains of inorganic material is such that the dopant is within 100 parts of the dopant per million parts of the body of an average concentration thereof throughout the volume. For example, if the average concentration is 500 parts of dopant per million parts of body, the uniformity and homogeneity is such that the dopant is between 400 and 600 parts of dopant per million parts of body throughout the body in the example. Such uniformity and homogeneity may be achieved by way of (large) open and interconnected pores that extend throughout the partially-sintered body, which may be filled by fluid dopant and then further sintered, as disclosed herein.

According to an Aspect D2, the body of Aspect D1 may be such that the volume is thick, wide, and long such that the volume overlays a cube geometry having an edge length greater than 6 cm, as discussed herein and as further described with respect to Aspects C1 and C11 for example.

Likewise, according to an Aspect D3, the body of Aspect D2 may be such that the grains comprise alumina, silica, germania, and/or titania, as disclosed herein and further discussed with regard to Aspect C6 for example.

According to an Aspect D4, the body of Aspect D3 may be such that the dopant comprises an element of the group consisting of nitrogen, sulfur, fluorine, chlorine, bromine, and iodine, as disclosed herein and further discussed with regard to Aspect C2 for example.

According to an Aspect D5, the body of Aspect D4 may be such that the grains are fused to one another such that the network is amorphous, as disclosed herein and further discussed with regard to Aspect C5 for example. Put another way, the network of grains form a solid glassy body.

According to an Aspect D6, the body of Aspect D5 may be such that the inorganic material is a first inorganic material. According to such an aspect, the body may then further comprise a second inorganic material at least partially surrounded by the first inorganic material and coupled thereto. FIG. 5B shows such a body 510 surround the body 610. According to an aspect, the first and second inorganic materials have a refractive index difference therebetween of at least 0.1%. The refractive index difference may facilitate total internal reflection in optical fibers made from the body of Aspect D6. The different inorganic materials may also provide other synergistic properties to the body of Aspect D6, such as if the second inorganic material contracts upon cooling more than the first inorganic material, and pulls the first inorganic material into compression, thereby tempering the body of Aspect D6.

According to an Aspect D6, the body of Aspect D5 may be such that the body further comprises a fiber portion extending from an end thereof. The fiber portion may be narrower than other parts of the body, such as having a lesser width and thickness, but may have a longer length than the rest of the body, such as by more than double, triple, one-hundred times, or more.

According to an Aspect D7, the body of Aspect D6 may be such that the fiber portion of the body is longer than 10 m, such as longer than 100 m, such as longer than 1 km, such as longer than 30 km, or other lengths as disclosed herein.

Construction and arrangements of the compositions, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. The order or sequence of any process, logical algorithm, or method steps may be varied or re-sequenced according to alternative embodiments. Other substitutions, modifications, changes and omissions may also be made in the design, operating conditions and arrangement of the various aspects without departing from the scope of the present inventive technology.

What is claimed is:

1. A method of making a doped-, sintered-body, the method comprising:

pressing together grains of an inorganic material to form a pressed body without collapsing at least some pores between the grains;

only partially-sintering the pressed body to form a partially-sintered body, wherein, during the only partially-sintering, at least some of the grains fuse to one another and some of the pores collapse, however following the only partial-sintering the partially-sintered body still comprises open and interconnected pores therethroughout;

moving a fluid dopant into the open and interconnected pores of the partially-sintered body; and further sintering the partially-sintered body to collapse the open and interconnected pores with the fluid dopant therein, to make the doped-, sintered-body.

2. The method of claim 1, wherein pores of pore size less than 0.5 micrometers are collapsed during the only partial sintering, before the moving of the fluid dopant into the open and interconnected pores of the partially-sintered body.

3. The method of claim 1, wherein the pores that collapse during the only partial sintering are smaller than the pores of the open and interconnected pores; and wherein, with the smaller pores closed and the larger open and interconnected pores remaining therein, the partially-sintered body has surface area therein of less than 10 $m^2/g$.

4. The method of claim 1, wherein the open and interconnected pores throughout the partially-sintered body are such that greater than 5 percent by volume of the pores is of pores greater than 3 micrometers in pore size.

5. The method of claim 1, wherein the pores of the pressed body are sized such that the pores comprise a spike in terms of incremental pore volume as a function of pore size with a peak of the spike positioned between 0.5 micrometers and 10 micrometers in pore size.

6. The method of claim 5, wherein the pore size distribution further comprises a dip in terms incremental pore volume adjoining the spike, lesser than the spike in terms of pore size, and wherein the peak of the spike comprises an incremental pore volume at least twice a local minimum of the dip.

7. The method of claim 1, further comprising agglomerating the grains with one another to increase size thereof prior to the pressing.

8. The method of claim 7, wherein prior to the agglomerating at least some of the grains have a surface area greater than 20 $m^2/g$, and wherein after the agglomerating at least some of the grains have a surface area less than 10 $m^2/g$.

9. The method of claim 1, wherein the doped-, sintered-body is greater than 3 kg in mass.

10. The method of claim 1, further comprising forming the grains by flame hydrolysis.

11. The method of claim 1, wherein the grains comprise metal-doped silica, and wherein the fluid dopant comprises a metal halide.

12. The method of claim 1, wherein the partial sintering is performed at a furnace temperature less than that of the further sintering by at least 25° C.

13. The method of claim 1, further comprising machining the partially-sintered body prior to the moving.

14. The method of claim 13, wherein the machining comprises drilling a hole in the partially-sintered body, the hole having a diameter of at least 5 mm and extending lengthwise through the partially-sintered body.

15. The method of claim 14, further comprising inserting a second body into the hole, wherein the second body comprises another inorganic material that differs from the inorganic material of the partially-sintered body in terms of refractive index.

16. The method of claim 15, further comprising first heating to a melting temperature and then drawing a fiber from a lengthwise end of the doped-, sintered-body, wherein the fiber has a length greater than 1 km.

17. A method of making a doped-, sintered-body, the method comprising:

pressing together grains of an inorganic material to form a pressed body without collapsing at least some pores between the grains;

only partially-sintering the pressed body to form a partially-sintered body;

wherein pores of pore size less than 0.5 micrometers are collapsed during the only partial sintering; and wherein, during the only partially-sintering, at least some of the grains fuse to one another and some of the pores collapse, however following the only partial-sintering the partially-sintered body still comprises open and interconnected pores therethroughout such that greater than 5 percent by volume of the pores is of pores greater than 3 micrometers in pore size;

moving a fluid dopant into the open and interconnected pores of the partially-sintered body;

wherein the fluid dopant comprises an element of the group consisting of nitrogen, sulfur, fluorine, chlorine, bromine, and iodine; and further sintering the partially-sintered body to collapse the open and interconnected pores with the fluid dopant therein, to make the doped-, sintered-body;

wherein the doped-, sintered-body is greater than 3 kg in mass.

18. The method of claim 17, wherein the partially-sintered body is squat, fully overlaying a cube-shaped volume therein with edge length of greater than 2 cm.

19. A method of making a doped-, sintered-body, the method comprising:

pressing together grains of an inorganic material to form a pressed body without collapsing at least some pores between the grains;

wherein the grains comprise alumina, silica, germania, and/or titania; and wherein the pores of the pressed body are sized such that the pores comprise a spike in terms of incremental pore volume as a function of pore size with a peak of the spike positioned between 0.5 micrometers and 10 micrometers in pore size;

only partially-sintering the pressed body to form a partially-sintered body;

wherein, during the only partially-sintering, at least some of the grains fuse to one another and some of the pores collapse, however following the only partial-sintering the partially-sintered body still comprises open and interconnected pores therethroughout;

wherein the pores that collapse during the only partially-sintering are smaller than the pores of the open and interconnected pores; and wherein, with the smaller pores closed and the larger open and interconnected pores remaining therein, the partially-sintered body has surface area therein of less than 10 $m^2/g$;

moving a fluid dopant into the open and interconnected pores of the partially-sintered body; and further sintering the partially-sintered body to collapse the open and interconnected pores with the fluid dopant therein, to make the doped-, sintered-body.

20. The method of claim 19, wherein after the further sintering the grains are fused to one another such that the doped-, sintered-body is amorphous.

* * * * *